No. 708,435. Patented Sept. 2, 1902.
F. WESEL.
MACHINE FOR SHAVING ELECTROTYPES.
(Application filed July 27, 1901.)
(No Model.) 4 Sheets—Sheet 1.

WITNESSES:
Walter Woellum
George B. Geibel

INVENTOR
Ferdinand Wesel
BY
Goepel & Wahle
ATTORNEYS

No. 708,435. Patented Sept. 2, 1902.
F. WESEL.
MACHINE FOR SHAVING ELECTROTYPES.
(Application filed July 27, 1901.)
(No Model.) 4 Sheets—Sheet 2.

WITNESSES:
Walter Waltherm.
George L. Seibel.

INVENTOR
Ferdinand Wesel
BY
Groner & Wahle
ATTORNEYS

No. 708,435. Patented Sept. 2, 1902.
F. WESEL.
MACHINE FOR SHAVING ELECTROTYPES.
(Application filed July 27, 1901.)
(No Model.) 4 Sheets—Sheet 3.
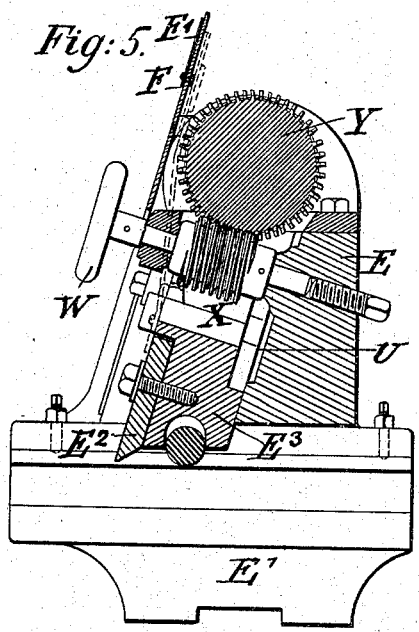
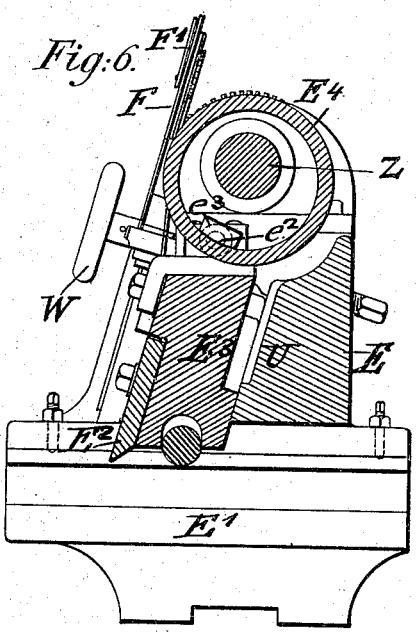
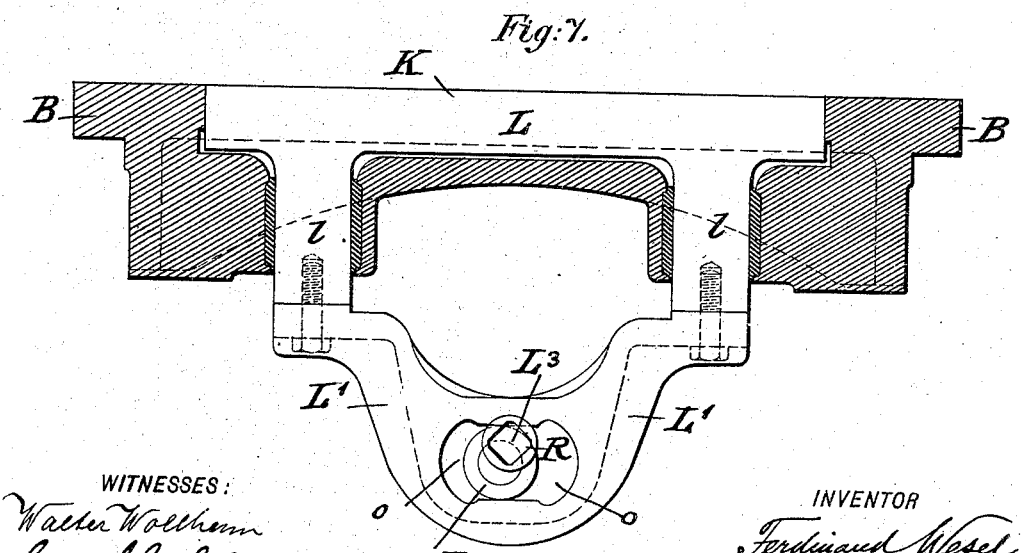
WITNESSES:
INVENTOR
Ferdinand Wesel
BY
ATTORNEYS No. 708,435. Patented Sept. 2, 1902.
F. WESEL.
MACHINE FOR SHAVING ELECTROTYPES.
(Application filed July 27, 1901.)
(No Model.) 4 Sheets—Sheet 4.
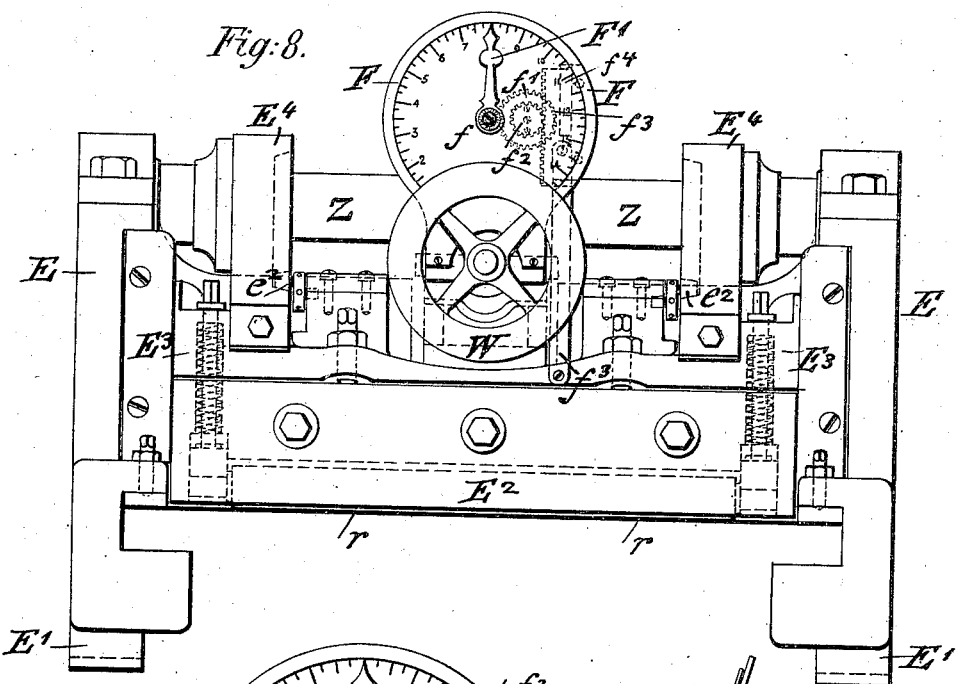
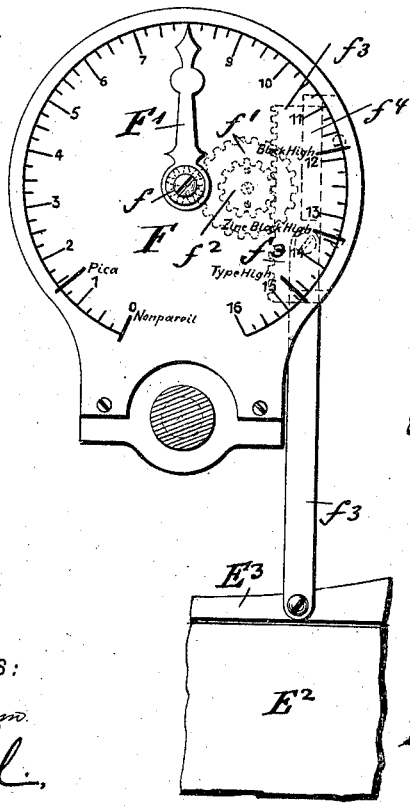
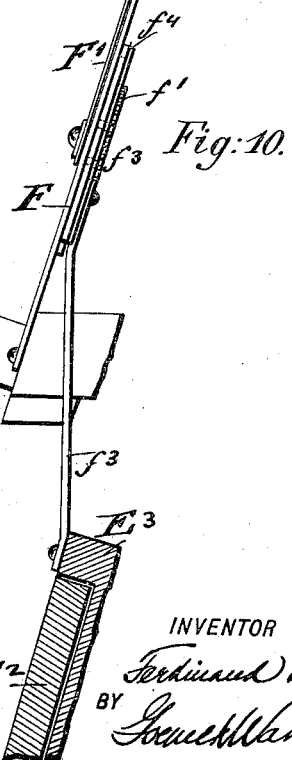
WITNESSES:
INVENTOR
Ferdinand Wesel
BY
ATTORNEYS

UNITED STATES PATENT OFFICE.

FERDINAND WESEL, OF BROOKLYN, NEW YORK.

MACHINE FOR SHAVING ELECTROTYPES.

SPECIFICATION forming part of Letters Patent No. 708,435, dated September 2, 1902.

Application filed July 27, 1901. Serial No. 69,937. (No model.)

*To all whom it may concern:*

Be it known that I, FERDINAND WESEL, a citizen of the United States, residing in New York, borough of Brooklyn, in the State of New York, have invented certain new and useful Improvements in Machines for Shaving Electrotypes, of which the following is a specification.

This invention relates to certain improvements in machines for shaving electrotypes, stereotypes, &c., to any desired height, as required, said machine being driven by power and provided with a reciprocating knife-head having an adjustable shaving-knife; and the invention consists of a machine for shaving stereotypes and electrotypes, which comprises a knife-head, a transverse knife-bar in said head, inclined ways on which said bar is adjusted, a shaving-knife attached to said bar, a transverse shaft provided with eccentric rings, a worm-gear for turning said shaft, and means by which said rings engage the knife-bar for adjusting the same; and the invention consists, further, of an indicating device actuated by the knife-bar for indicating the adjustment of the shaving-knife and certain other novel features of construction, as will be fully described hereinafter and finally pointed out in the claims.

Figure 1:
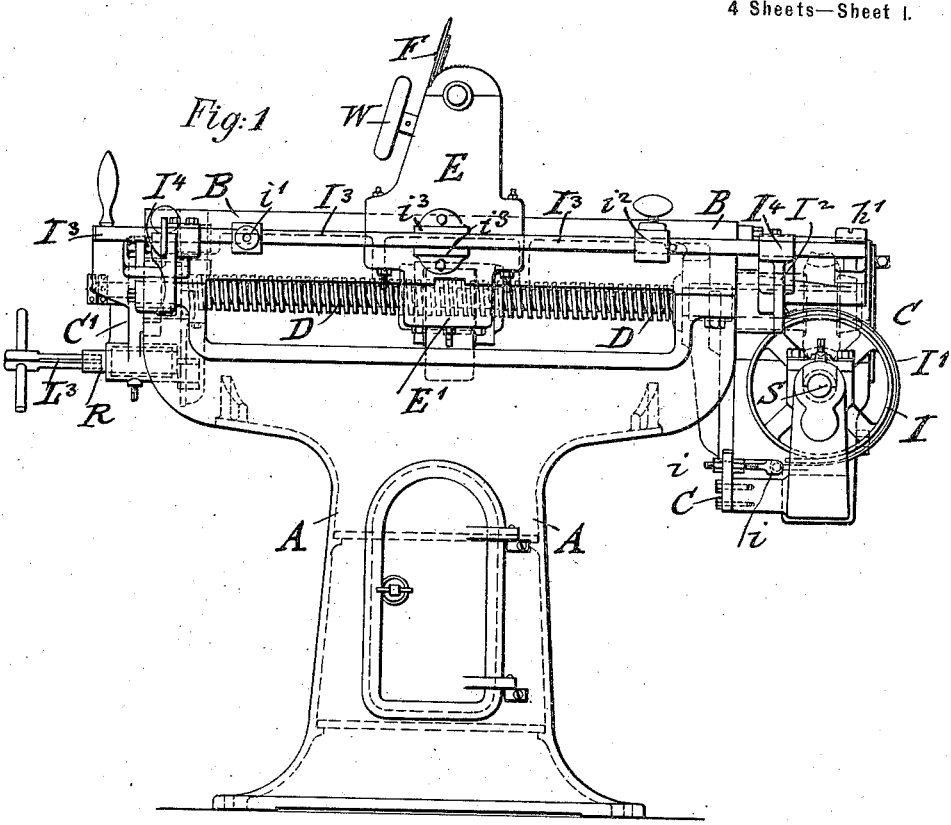
Figure 2:
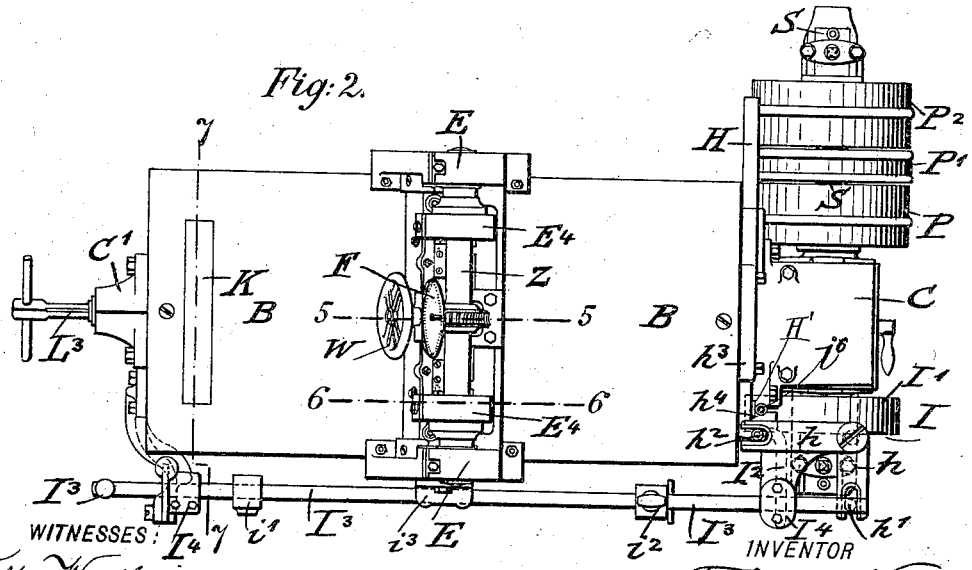
Figure 3:
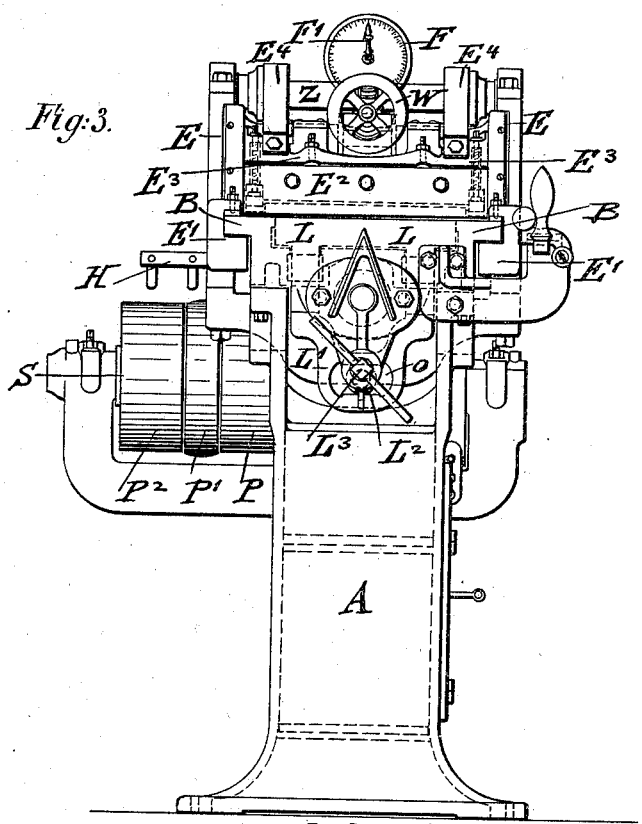
Figure 4:
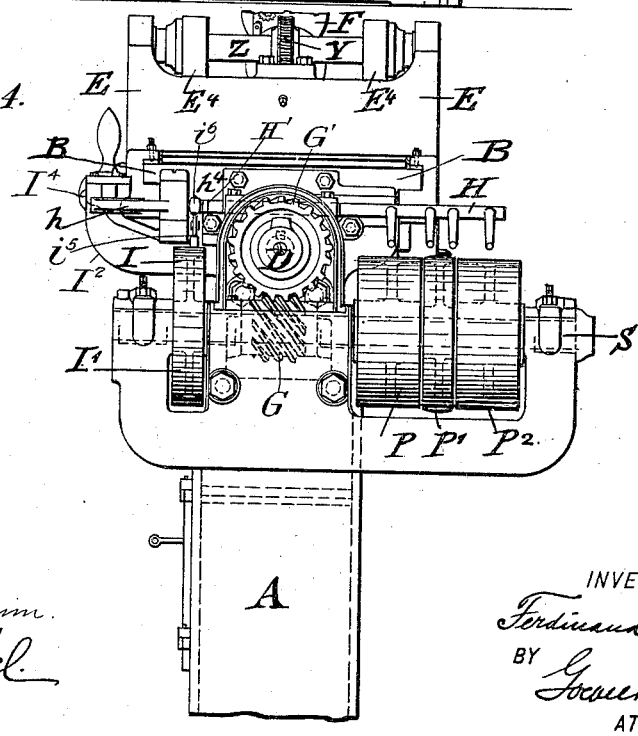

In the accompanying drawings, Figure 1 represents a side elevation of my improved machine for shaving electrotypes and other printing-plates. Fig. 2 is a plan view. Figs. 3 and 4 are end elevations, respectively, of the left and right hand ends. Figs. 5 and 6 are vertical transverse sections through the knife-head, taken, respectively, on lines 5 5 and 6 6, Fig. 2, drawn on a larger scale. Fig. 7 is a detail vertical transverse section through the bed-plate on line 7 7, Fig. 2, drawn on a larger scale. Fig. 8 is a front elevation of the knife-head; and Figs. 9 and 10 are details of the mechanism for indicating the adjustment of the shaving-knife.

Similar letters of reference indicate corresponding parts.

Referring to the drawings, A represents the supporting-frame of my improved stereotype-shaving machine. On the frame A is supported a bed-plate B, which is provided at opposite ends with downwardly-projecting brackets C C', which are supported on the frame A and provided with suitable bearings for a longitudinal screw-spindle D, which engages the lower transverse portion E' of a knife-head E, that is guided by ways on the bed-plate B. The transverse lower portion of the knife-head E is engaged by the screw-spindle and moved forward and backward by the same over the bed-plate.

The spindle D is driven by means of a worm-gear from a transverse shaft S at one end of the machine, said shaft receiving motion in one or the opposite direction by power-belts and tight and loose pulleys P P' P² on the rear end of said shaft. A worm G on the driving-shaft S meshes with a worm-gear G' on the screw-spindle D, as shown in Fig. 4. A belt-shifting device H is arranged above the pulleys P P' P² and operated automatically by the reciprotating knife-head and suitable mechanism between it and the belt-shifting device. On the opposite end of the driving-shaft S is arranged a brake-wheel I, around which extends a brake-band I', the lower end of which is attached by an adjustable eyebolt $i$ to the downwardly-extending bracket C of the bed-plate B, while the upper end is attached to the lower end of a lever $I^5$, pivoted to a downwardly-extending arm $I^2$ of a bracket $I^4$. Supported at one end in the bracket $I^4$ is a shiftable slide-rod $I^3$, provided at opposite ends with the stops $i'$ $i^2$, as shown in Figs. 1 and 2. When the knife-head E arrives at either end of its motion, one stop or the other is engaged by projecting cheeks $i^3$, which are attached to the side wall of the knife-head and guided along the slide-rod $I^3$, as shown in Fig. 1, said cheeks abutting against either stop $i'$ $i^2$, so that the slide-rod is moved in one or the opposite direction, so as to produce thereby the simultaneous actuation of the belt-shifting device H and of the brake device, and thereby the gradual stopping of the knife-head and the automatic reversing of its motion. The action of the belt-shifting device H is produced by a fulcrumed elbow-lever $h$, the recessed front end of which is engaged by a pin $h'$ on the right-hand end of the slide-rod $I^3$, while its rear end engages a pin $h^2$ on the transverse slide-rod $h^3$ of the belt-shifting device H. The action of the brake device is also produced by the shifting device H, which is provided with the lug H', on which is adapted to pass the roller $i^6$ at the upper end of the brake-lever $i^5$, to which the brake-band I' is attached at its upper end. The lug H' by thrusting the upper end of the lever $i^5$ in outward direction causes the lower end to move inwardly, thereby applying the brake-band to the wheel I, which is attached to the driving-shaft S, and thus the high speed and momentum of the power-wheel is overcome quickly, so that the reversing of the driving-shaft is accomplished without a great loss of time.

Near the left-hand end of the machine is arranged in an oblong recess of the bed-plate B a so-called "stop-gage" K, which consists of two portions L L', the upper portion L having downwardly-extending legs $l$ cast in one piece with the upper horizontal portion and a lower yoke-shaped piece L'. The lower piece L' is attached by means of fastening-screws to the upper portion L and provided with a horizontal slot $o$ at its center, in which is arranged an eccentric $L^2$. This eccentric is turned by means of a key $L^3$, that engages its shaft R, so as to turn it. The shaft R of the eccentric is supported in bearings in the left-hand bracket C' of the frame B. On turning the shaft the eccentric follows the same and produces the raising or lowering of the stop-gage K, so that the same is either raised above the level of the bed-plate for supporting the plate or block to be shaved or lowered to a level with the bed-plate B when the shaved block is to be removed. The upper portion L of the stop-gage K is guided in the recess of the bed-plate, the stop-gage forming an important accessory of the shaving-machine.

The knife-head E is provided with a shaving-knife $E^2$, which is attached by clamping-screws to a transverse knife-bar $E^3$. The knife-bar $E^3$ is guided in upward or downward direction on inclines U, that are arranged at the inside of the head E. The adjustment of the knife-bar is made by means of a hand-wheel W, which is located at the center of the knife-head E, the shaft of the hand-wheel being provided with a worm X, which meshes with a worm-wheel Y, as shown in Fig. 5. On the shaft Z of the worm-wheel are arranged two eccentric rings $E^4$. The eccentric rings $E^4$ engage pins $e^2$, that are fastened to the knife-bar $E^3$ by means of caps $e^3$, secured to the upper end of the knife-bar $E^3$ by means of fastening-screws, so that the knife-bar is raised or lowered on the inclines U by turning the hand-wheel W in one or the opposite direction, whereby the knife is raised or lowered quickly and conveniently to the approximate thickness of the plate to be shaved. The quick and accurate adjustment of the shaving-knife $E^2$ for the exact height of type is indicated on a separate indicating device, which is shown in detail in Figs. 8 to 10 and which consists of a stationary graduated dial F above the hand-wheel W, which is provided with special marks for indicating the height of the different types or blocks. Over the dial is moved a pointer F', to the pivot of which is keyed a pinion $f$, that meshes with a gear-wheel $f'$. The shaft of the gear-wheel $f'$ carries a pinion $f^2$, which meshes with a rack-bar $f^3$, that is guided on ways $f^4$ at the rear of the dial F. The shaft of the intermediate gear-wheel $f'$ turns in bearings at the rear of the dial, as shown in Figs. 9 and 10. The rack-bar $f^3$ is extended in downward direction and pivoted to the upper part of the knife-bar, as shown in Fig. 8, so that by the movement of the pointer F' over the dial the adjustment of the knife-bar and shaving-knife for the exact thickness of the plate or block is indicated. The lower end of the base of the knife-head E is provided with an anti-friction-roller $r$, which is located in a recess in the base of the knife-bar and supported in spring-cushioned bearings, as shown in Fig. 8, so as to permit the knife-bar to move easily over the bed-plate and the plate to be shaved.

The operation of my improved machine for shaving electrotypes, &c., is the same as that of similar shaving-machines heretofore in use and requires no special description.

The improvements of my shaving-machine consists, primarily, in the arrangement of the automatic brake for arresting the motion of the knife-head in either direction; secondly, in the arrangement of the adjustable stop-gage for holding the plate to be shaved in position on the bed-plate, and, thirdly, in the special construction of the knife-head by which the shaving-knife can be easily, quickly, and accurately adjusted to the exact height of the plate or block to be shaved.

Having thus described my invention, I claim as new and desire to secure by Letters Patent—

1. In a stereotype-shaving machine, the combination with the bed-plate, of a knife-head guided on the same, a shaving-knife supported by said knife-head, means for reciprocating the knife-head, a stop-gage guided in a recess of the bed-plate, a lower yoke-shaped piece secured to said stop-gage, and means, in said yoke-shaped piece, for raising or lowering said stop-gage, substantially as set forth.

2. In a stereotype-shaving machine, the combination, with the bed-plate, of a stop-gage guided in a recess of the bed-plate, an eccentric engaging the lower portion of said stop-gage, and means for turning said eccentric for raising or lowering the stop-gage, substantially as set forth.

3. In a stereotype-shaving machine, the combination, with the knife-head, of a transverse knife-bar in said head, inclined ways on which said bar is adjusted, a shaving-knife attached to said bar, a transverse shaft provided with eccentric rings, a worm-gear for turning said shaft, and means by which said rings engage the knife-bar for adjusting the same, substantially as set forth.

4. In a stereotype-shaving machine, the combination, with the knife-head, of a transverse knife-bar guided in said head, a shaving-knife attached to said knife-bar, means for adjusting the knife-bar in the knife-head, and an indicating device actuated by the knife-bar for indicating the adjustment of the shaving-knife, substantially as set forth.

5. In a stereotype-shaving machine, the combination with the knife-head, of a transverse knife-bar guided on said head, a shaving-knife attached to said knife-bar, means for adjusting said knife-bar in the knife-head, and an indicating device actuated by the knife-bar and consisting of a graduated dial-plate, a pointer and motion-transmitting gearing between the knife-bar and the pointer for moving the latter over the dial and indicating the required adjustment of the knife-bar, substantially as set forth.

In testimony that I claim the foregoing as my invention I have signed my name in presence of two subscribing witnesses.

FERDINAND WESEL.

Witnesses:
PAUL GOEPEL,
GEORGE GEIBEL.